United States Patent
Hori et al.

(10) Patent No.: US 8,944,692 B2
(45) Date of Patent: Feb. 3, 2015

(54) SLEWING BEARING AND ROTATING SECTION SUPPORT DEVICE FOR WIND TURBINE

(75) Inventors: Michio Hori, Kuwana (JP); Nurumu Kuwahara, Kuwana (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 13/384,698

(22) PCT Filed: Jul. 20, 2010

(86) PCT No.: PCT/JP2010/062165
§ 371 (c)(1),
(2), (4) Date: Jan. 18, 2012

(87) PCT Pub. No.: WO2011/013536
PCT Pub. Date: Feb. 3, 2011

(65) Prior Publication Data
US 2012/0195538 A1 Aug. 2, 2012

(30) Foreign Application Priority Data

Jul. 27, 2009 (JP) .................................. 2009-174261

(51) Int. Cl.
*F16C 43/06* (2006.01)
*F16C 33/58* (2006.01)
(Continued)

(52) U.S. Cl.
CPC .......... *F03D 7/0204* (2013.01); *F03D 11/0008* (2013.01); *F16C 19/181* (2013.01);
(Continued)

(58) Field of Classification Search
CPC .... F16C 19/181; F16C 19/20; F16C 33/3706; F16C 2360/31
USPC .......... 384/520, 521, 522, 51, 516, 507, 508, 384/512, 613, 513, 514
See application file for complete search history.

(56) References Cited

U.S. PATENT DOCUMENTS 3,361,501 A 1/1968 Messinger et al.
4,961,653 A * 10/1990 Suzuki et al. ................. 384/447
(Continued)

FOREIGN PATENT DOCUMENTS

CN 201487047 U * 5/2010
JP 1-174626 12/1989
(Continued)

OTHER PUBLICATIONS

Machine translation of CN 201487047 U obtained on Jul. 9, 2014.*
(Continued)

*Primary Examiner* — Thomas R. Hannon
*Assistant Examiner* — Adam D Rogers (57) ABSTRACT

A slewing bearing assembly effective to suppress additional expenses such as a mold cost and to resolve the problem associated with insufficient strength brought about by voids and, also, a rotation section support apparatus for a wind powered turbine are provided. The slewing bearing assembly includes inner and outer rings having raceway grooves, and a plurality of balls interposed between the raceway grooves, and a spacer interposed between the neighboring balls. This slewing bearing assembly is a four point contact ball bearing, in which respective sectional shapes of the raceway grooves are so shaped as to represent shapes in which each balls contacts inner surfaces of the raceway grooves in the inner and outer rings at four points. The spacer is made of a resinous material having a melt viscosity within the range of 1000 to 2000 Pa·s at a temperature of 270° C.

8 Claims, 7 Drawing Sheets

(51) Int. Cl.
    *F16C 19/20*     (2006.01)
    *F03D 7/02*     (2006.01)
    *F03D 11/00*     (2006.01)
    *F16C 19/18*     (2006.01)
    *F16C 33/37*     (2006.01)

(52) U.S. Cl.
    CPC ............ *F16C 19/20* (2013.01); *F16C 33/3706* (2013.01); *F16C 2300/14* (2013.01); *Y02E 10/722* (2013.01); *Y02E 10/726* (2013.01); *Y02E 10/723* (2013.01); *F16C 2360/31* (2013.01)
    USPC ............ 384/507; 384/508; 384/513; 384/521

(56) References Cited

U.S. PATENT DOCUMENTS

| | | | | |
|---|---|---|---|---|
| 5,026,177 | A * | 6/1991 | Masuda | 384/447 |
| 5,033,873 | A * | 7/1991 | Suzuki | 384/447 |
| 6,821,604 | B2 * | 11/2004 | Kasuga et al. | 428/156 |
| 7,146,869 | B2 * | 12/2006 | Miyaguchi et al. | 74/89.32 |
| 7,296,933 | B2 * | 11/2007 | Tsujimoto | 384/571 |
| 7,703,985 | B2 * | 4/2010 | Olsen | 384/510 |
| 7,758,245 | B2 * | 7/2010 | Ishihara et al. | 384/51 |
| 8,523,451 | B2 | 9/2013 | Ozu et al. | |
| 8,579,511 | B2 * | 11/2013 | Kikuchi | 384/447 |
| 2003/0059142 | A1 * | 3/2003 | Shirokoshi et al. | 384/516 |
| 2003/0087063 | A1 | 5/2003 | Kasuga et al. | |
| 2006/0230856 | A1 * | 10/2006 | Okita et al. | 74/424.88 |
| 2009/0220181 | A1 * | 9/2009 | Yamada et al. | 384/513 |
| 2009/0252448 | A1 | 10/2009 | Ozu et al. | |
| 2009/0257697 | A1 * | 10/2009 | Andersen | 384/455 |
| 2010/0068058 | A1 | 3/2010 | Sorensen | |
| 2011/0085756 | A1 * | 4/2011 | Hori et al. | 384/513 |

FOREIGN PATENT DOCUMENTS

| | | |
|---|---|---|
| JP | 8-303466 | 11/1996 |
| JP | 2000-170754 | 6/2000 |
| JP | 2002-339981 | 11/2002 |
| JP | 2004-324854 | 11/2004 |
| JP | 2005-207264 | 8/2005 |
| JP | 2007-92983 | 4/2007 |
| JP | 2007-198589 | 8/2007 |
| JP | 2007-278178 | 10/2007 |
| JP | 2008-82380 | 4/2008 |
| JP | 2008-308117 | 12/2008 |
| JP | 2008-544133 | 12/2008 |
| JP | 2009-156295 | 7/2009 |
| WO | WO 2006/133715 | 12/2006 |

OTHER PUBLICATIONS

Japanese Office Action mailed Apr. 2, 2013 for corresponding Japanese Application No. 2009-174261.
International Search Report for PCT/JP2010/062165 mailed Oct. 26, 2010.
Japanese Office Action mailed Aug. 13, 2013 in corresponding Japanese Application No. 2009-174261.
Chinese Office Action issued Jun. 26, 2013 in corresponding Chinese Application No. 201080033307.1.
International Preliminary Report on Patentability mailed Feb. 16, 2012 issued in corresponding International Patent Application No. PCT/JP2010/062165.
Chinese Office Action mailed Jan. 8, 2014 in corresponding Chinese Application No. 201080033307.1.
Japanese Office Action mailed Feb. 25, 2014 in corresponding Japanese Application No. 2009-174261.
Chinese Office Action issued May 12, 2014 in corresponding Chinese Patent Application No. 201080033307.1.
Japanese Notification of Reason(s) for Rejection issued Sep. 9, 2014 in corresponding Japanese Patent Application No. 2009-174261.
Chinese Office Action issued Jul. 25, 2014 in corresponding Chinese Patent Application No. 201080033307.1.
Chinese Office Action issued on Oct. 24, 2014 in corresponding Chinese Patent Application No. 201080033307.1.

* cited by examiner

SLEWING BEARING AND ROTATING SECTION SUPPORT DEVICE FOR WIND TURBINE

CROSS REFERENCE TO RELATED APPLICATIONS

This application claims the benefit under 35 U.S.C. Section 371, of PCT International Application No. PCT/JP2010/062165, filed Jul. 20, 2010, which claimed priority to Japanese Application No. 2009-174261, filed Jul. 27, 2009 in the Japanese Patent Office, the disclosures of which are hereby incorporated by reference.

BACKGROUND OF THE INVENTION

1. Field of the Invention

The present invention relates to a slewing bearing assembly, which is used in a rotation section for yaw and a wind mill of a wind powered turbine and in a deck crane as a slewing pedestal and also to a rotation section support apparatus for the wind powered turbine.

2. Description of Related Art

A slewing bearing assembly is currently employed in a rotation section or the like for yaw and a wind mill of the wind powered turbine (a wind powered, electricity generating turbine). In the wind powered turbine, need is generally recognized to change the angle of each of the blades and the orientation of a nacelle as needed in dependence on the wind condition. For this reason, the blades and the nacelle are rotatably supported by respective slewing bearing assemblies and are rotated by respective drive mechanism not shown.

As a retainer type for the slewing bearing assembly, a spacer type, that is, a rolling element separator type (the patent document 1 listed below) or a retainer type are available. The slewing bearing assembly used in the wind powered turbine is susceptible to a radial load and a moment load in addition to an axial load.

PRIOR ART DOCUMENT

[Patent Document 1] JP Laid-open Utility Model Publication No. H01-174626

SUMMARY OF THE INVENTION

When a radial load or a moment load acts on the slewing bearing assembly used in, for example, a wind powered turbine or the like, contact angles of the rolling elements differ from one rolling element to another and the orbital speed of each of the rolling elements or the like changes. Where the spacer referred to previously is used, in the event that a circumferential gap between each of the rolling elements and the corresponding spacer is clogged, a force of interference is generated between the rolling element and the spacer.

Since the spacer has its dimensions determined for the ball size, it can be concurrently used with various bearing sizes regardless of the ball PCD. For this reason, it is possible to suppress additional expenses such as, for example, a mold cost. Hitherto, the retainer type used in the slewing bearing assembly for use in a construction machinery and a crane is a spacer type made of a resinous material.

It is quite often that the ball size used in the slewing bearing assembly for the yaw and blades of a large size wind powered turbine of a power generating capacity of 1 MW or higher is generally large and the size exceeding the ball diameter of 30 mm is often used. Since the resin made spacer for use with balls of a diameter 30 mm or greater tends to be a thick walled product, voids are apt to occur in a surface and/or inside of the resin made spacer during the injection molding.

Merits and demerits of the resin made spacer are here enumerated.

Merits:
(1) The resin made spacer is concurrently usable regardless of the ball PCD.
(2) Low mass.
(3) Low price.

Demerits:
(1) Insufficient strength due to the presence of voids.
(2) Separation and collection, collection and distribution apt to occur easily relative to the retainer type.

Although a method of eliminating the voids by forming a relief is generally thought of, it is not an acceptable idea when considering the strength.

An object of the present invention is to provide a slewing bearing assembly, which is effective to suppress additional costs such as, for example, a mold cost, and to resolve the problem associated with the insufficient strength brought about by the presence of voids, and also to provide a rotation section support apparatus for the wind powered turbine.

A slewing bearing assembly in accordance with the present invention is a slewing bearing assembly of a type, in which raceway grooves are formed in inner and outer rings, respectively, a plurality of balls are interposed between the raceway grooves of those inner and outer rings and the use is made of a spacer interposed between the neighboring balls, in which the slewing bearing assembly is a four point contact ball bearing having respective sectional shapes of the raceway grooves formed to represent shapes effective to allow each ball to achieve a four point contact with inner surfaces of the raceway grooves of the inner and outer rings and in which the spacer is made of a resinous material, the resinous material having a melt viscosity within the range of 1000 to 2000 Pa·s.

According to the construction described above, since the resinous material of the spacer is chosen to be of a kind having a melt viscosity not lower than 1000 Pa·s (270° C. in temperature), an undesirable occurrence of voids in a surface and/or inside of the spacer can be suppressed even through the spacer has a thick wall. Accordingly, it is possible to prevent the spacer from having an insufficient strength. Since the spacer has its dimensions determined in dependence on the ball size, it can be concurrently used with various bearing sizes regardless of the ball PCD. For this reason, the additional costs of the mold cost or the like can be suppressed. Therefore, it is possible to reduce the cost of manufacture of the slewing bearing assembly. Also, since it is a four point contact ball bearing, in which the ball is held in contact with an inner surface of a raceway groove in inner and outer rings at four locations, it is possible to load an axial load in both directions.

In one embodiment of the present invention, the spacer may have opposite sides formed with ball contact surfaces each having a recessed shape recessed deeply towards a center portion and a gate position of a mold assembly for injection molding the spacer is arranged at a bottom portion of the recessed shape. If, for example, the gate position of the mold assembly is arranged in an outer diametric portion of the spacer, it occurs quite often that the rage of occurrence of the voids becomes high and a bias occurs in the strength in a circumferential direction of the spacer (a condition after the bearing assembly has been incorporated). In contrast thereto, arranging the gate position of the mold at a bottom portion of the recessed surface shape referred to above, it is possible to reduce the rate of occurrence of the voids and also to avoid the occurrence of the bias in the strength in the circumferential direction of the spacer. The spacer is such that the ball contact surface on opposite sides thereof is rendered to represent a concaved surface shape depressed deep towards a center portion thereof, and, with a depression recessed deeper than the recess defined at a center portion of the recess, the gate position of the mold assembly used to injection mold the spacer may be provided in that depression.

The resinous material used in forming the spacer may be PA6. "PA6" means a polyamide synthesized by ring-opening polymerization and condensation of caprolactam and is also referred to as "Nylon 6".

Each of the balls may have a diameter within the range of 30 to 80 mm. In the case of the spacer used with the ball of such a diametric dimension, it becomes a thick walled produce larger than that of the spacer used with the balls of a diameter not greater than 30 mm. Even with the spacer representing such a thick walled product, the occurrence of the voids in the surface and/or inside of the spacer is suppressed and the possibility of having an insufficient strength can be avoided since the resinous material of the spacer is chosen to be of a kind having a melt viscosity of 1000 Pa·s (270° C. in temperature) or higher.

Since the various functions and effects described hereinabove can be obtained, the slewing bearing assembly of the present invention can be used for supporting a wind mill of the wind powered turbine relative to a main shaft for rotation about an axis substantially perpendicular to an axis of the main shaft and also for supporting a nacelle of the wind powered turbine for rotation relative to a support post.

Also, a rotation section support apparatus for the wind powered turbine designed in accordance with the present invention is of a type having each blade of the wind mill supported by the slewing bearing assembly of the structure described previously for rotation about an axis substantially perpendicular to an axis of the main shaft relative to a main shaft. According to this construction, each blade of the wind mill of the wind powered turbine can be caused to rotate about the axis substantially perpendicular to the main shaft axis and the optimum angle of rotation can be controlled to suit to the wind condition.

Furthermore, the rotation section support apparatus for the wind powered turbine according to the present invention is of type having a nacelle of the wind powered turbine supported by the slewing bearing assembly of the structure described hereinabove for rotation about a support post. According to this construction, the orientation of the nacelle can be changed as needed to follow the wind condition.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE PREFERRED EMBODIMENTS

A first embodiment of the present invention will now be described in detail with particular reference to FIGS. 1 to 7. A slewing bearing assembly shown therein is used as a bearing assembly in, for example, rotatably supporting, relative to a main shaft, a wind mill of a wind powered turbine for rotation about an axis substantially perpendicular to an axis of the main shaft or in supporting a nacelle of the wind powered turbine relative to a support post.

Figure 1:
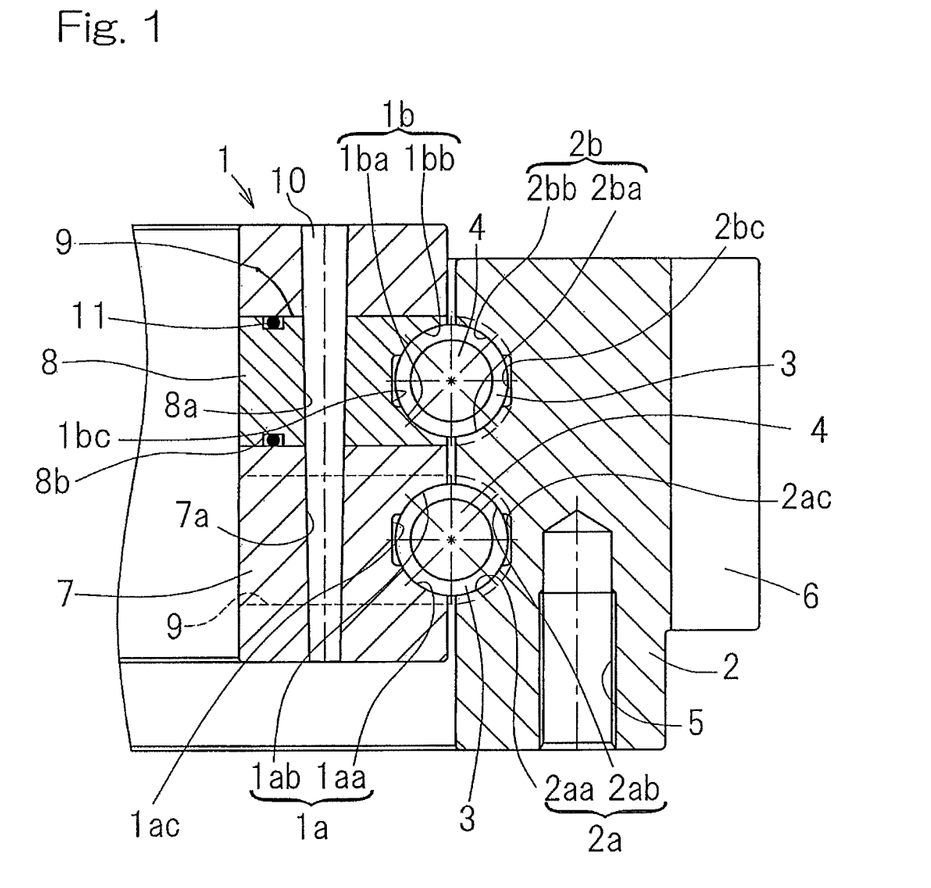
FIG. 1 is a sectional view showing a slewing bearing assembly designed in accordance with a first embodiment of the present invention.

Referring to FIG. 1, the slewing bearing assembly includes an inner ring 1 having defined therein a plurality of, for example, two, raceway grooves 1a and 1b, an outer ring 2 having defined therein a corresponding number of raceway grooves 2a and 2b, and corresponding rows of balls 3, one row rollingly interposed between the raceway grooves 1a and 2a and the other row rollingly interposed between the raceway grooves 1b and 2b, and a spacer 4 interposed between the neighboring balls 3 of each of the ball rows. Each of the raceway grooves 1a, 1b, 2a and 2b in the inner and outer rings 1 and 2 is defined by two curved faces 1aa and 1ab, 1ba and 1bb, 2aa and tab, and 2ba and 2bb.

The two curved faces defining each of the raceway grooves 1a, 1b, 2a and 2b have respective radius of curvature greater than the radius of curvature of each of the balls 3 and represents an arcuate sectional shape similar to the Gothic arch having the centers of curvature that are different from each other. A clearance between the two curved faces defining each of the raceway grooves 1a, 1b, 2a and 2b forms a furrow 1ac, 1bc, 2ac or 2bc. Each of the balls 3 is supported at four contact points on the curved faces of the inner ring raceway grooves 1a and 1b and of the outer ring raceway grooves 2a and 2b. Each ball 3 can be suitably employed if it has a diameter within the range of, for example, 30 to 80 mm. The slewing bearing assembly is configured as a four point contact type double row ball bearing.

The outer ring 2 has first and second end opposite to each other and, in the instance as shown, this outer ring 2 has a plurality of internally threaded bolt holes 5 defined in the first end thereof and spaced circumferentially a predetermined distance from the next adjacent internally threaded bolt hole 5. This outer ring 2 also has gear teeth 6 formed in an outer periphery thereof. The gear 6 transmits a slewing drive from a drive source (not shown) to the outer ring 2. The plural internally threaded bolt holes 5 referred to above are holes necessitated to fixedly connect the outer ring 2 to, for example, a support post. The inner ring 1 includes a raceway ring body 7, having insertion holes 9 and 9 defined therein as will be detailed later, plugs 8 and 8 inserted respectively into the insertion holes 9 and 9, a connecting member 10 and an annular sealing member 11. The raceway ring body 7 and the upper and lower plugs 8 and 8, described on upper side and lower side in FIG. 1, respectively, are held in coaxial relation to each other and are formed so as to have inner and outer diameters equal to each other. The raceway ring body 7 is formed with the plural rows of the raceway rings 1a and 1b, and the plugs 8 and 8 have respective outer diametric surfaces forming respective circumferential parts of the rows of the raceway grooves 1a and 1b. The distance between the raceway grooves 1a and 1b in the inner ring 1 and the distance between the raceway grooves 2a and 2b in the outer ring 2 are so designed as to be of the same dimensions.

Figure 2A:
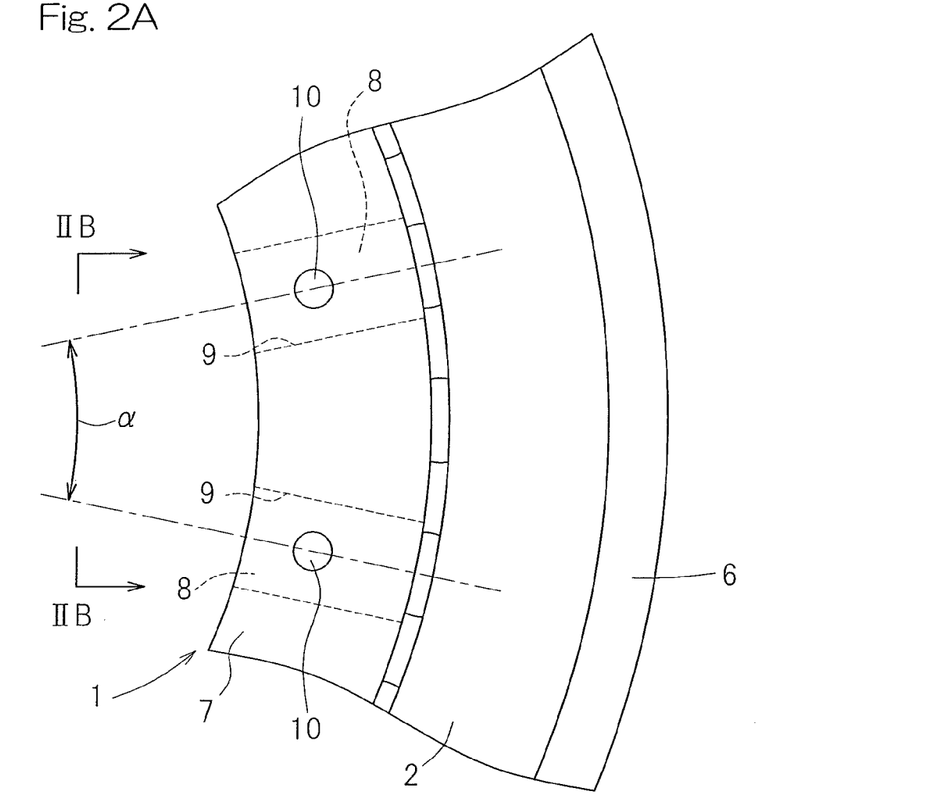
FIG. 2A is a fragmentary top plan view showing the slewing bearing assembly with a portion thereof cut out.
Figure 2B:
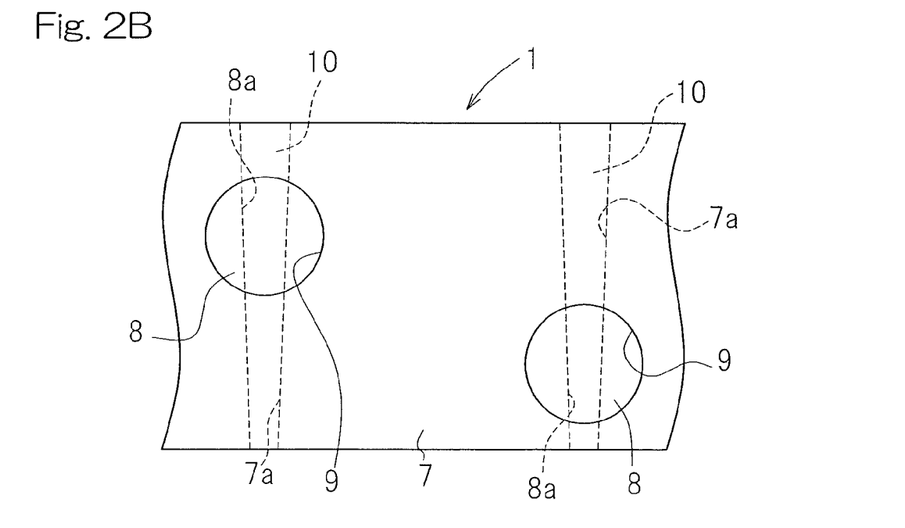
FIG. 2B is an end view showing the slewing bearing assembly as viewed in a direction indicated by IIB-IIB in FIG. 2A.

As shown in FIG. 1 and FIGS. 2A and 2B, the raceway ring body 7 is provided with insertion holes 9 and 9 each defined between the raceway grooves 1a and 2b or between the raceway grooves 2a and 2b for inserting the corresponding balls 3 and the corresponding spacers 4. Each of those insertion holes 9 and 9 is defined in the raceway ring body 7 so as to completely extend therethrough in a bearing diametric direction and is formed in a cylindrical shape (See FIG. 2B). Also, as best shown in FIG. 2A, neighboring insertion holes 9 and 9 is disposed at a position adjacent to each other in a circumferential direction, that is, at positions so as to define phase angle α of, for example, 4 to 5°. It is, however, to be noted that the phase angle α may not be necessarily limited to 4 to 5°. The raceway ring body 7 is provided with the plug 8 that is employed for and inserted into each insertion hole 9, such plug 8 being fixed to the raceway ring body 7 by means of the respective connecting member 10. For the connecting member 10, a tapered pin may be employed as best shown in FIG. 1. The raceway ring body 7 and each of the plugs 8 are formed with respective connecting holes 7a and 8a, into which the associated tapered pin is axially inserted under an interference fit to thereby assemble the raceway ring body 7 and each of the plugs 8 having been arranged in a coaxial relation with each other.

A portion of an outer peripheral surface of each of the plugs 8 adjacent a position radially inwardly of the associated connecting hole 8a is formed with an annular groove 8b, and the annular sealing member 11 referred to previously is fitted into this annular groove 8b to thereby increase the sealability of the respective plug 8 relative to the associated insertion hole 9 in the raceway ring body 7. The annular sealing member 11 is in the form of an elastic member made of a rubber or resinous material such as, for example, an O-ring. An annular bearing space delimited between the inner and outer rings 1 and 2 is filled with a quantity of grease and has opposite axial ends thereof sealed by respective sealing members not shown.

The details of each of the spacers 4 will now be described. The spacer 4 is made of a resinous material such as, for example, PA6. For this resinous material, a resinous material having a melt viscosity within the range of 1000 to 2000 Pa·s at a temperature of 270° C. is chosen. This resinous material is not necessarily be limited to PA6, but PA66 or PA46 may be equally employed, noting that any resinous material having the melt viscosity within the range of 1000 to 2000 Pa·s at the temperature of 270° C. may be employed satisfactorily.

Figure 3:
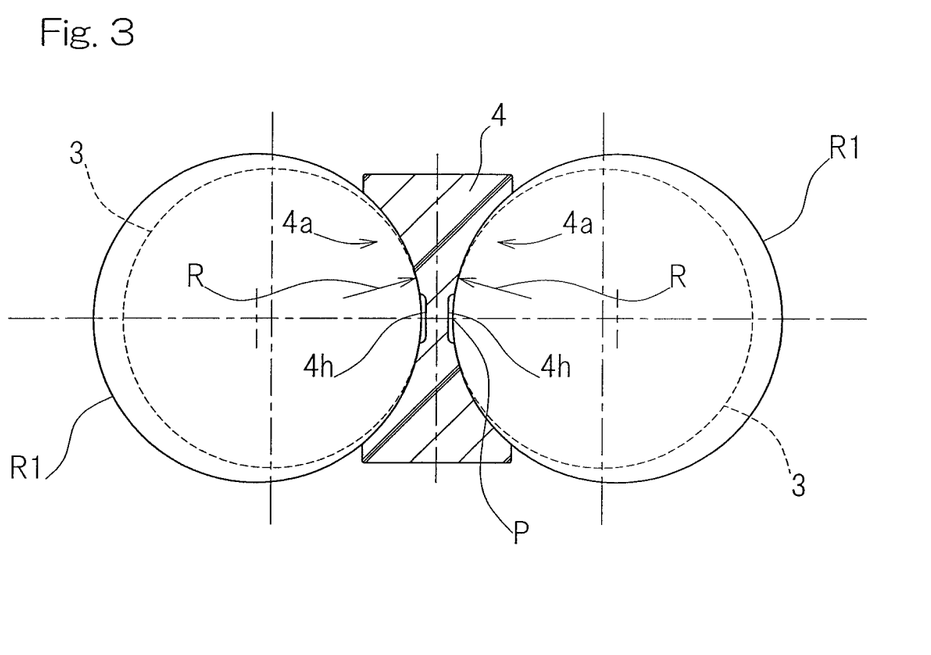
FIG. 3 is a diagram showing the relationship between a spacer, employed in the slewing bearing assembly, and one of balls.
Figure 5:
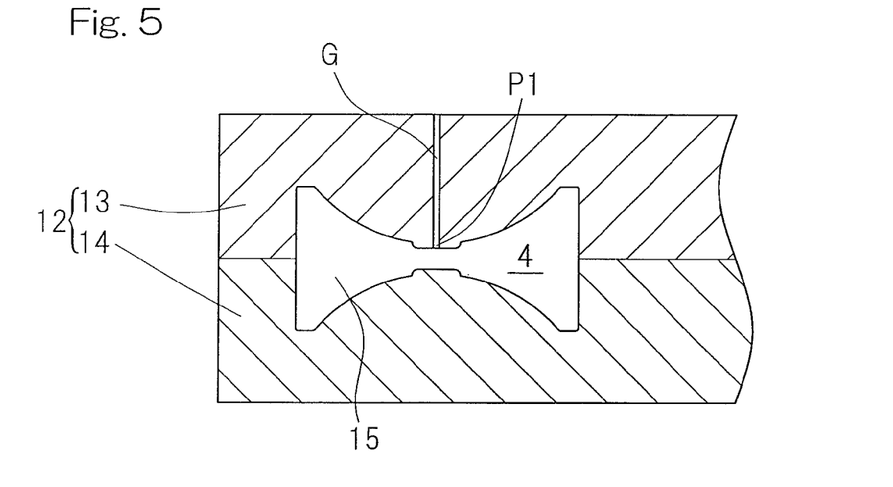
FIG. 5 is a schematic sectional view showing a mold used to form the spacer.

As shown in FIG. 3, the spacer 4 has ball contact surfaces 4a and 4a each defined in one of opposite sides thereof and representing an inwardly recessed spherical surface of a recessed shape, having been deeply recessed inwardly thereof towards a center portion thereof. A portion of the recess of the recessed shape on each side of the spacer 4 is provided with a depression 4h depressed deeper than the above described recess and, as shown in FIG. 5, a gate position P1 of an injection molding mold assembly 12 for forming the respective spacer 4 is disposed at the depression 4h. In other words, the gate position P1 is disposed at the bottom of the ball contact surface 4a.

Figure 4:
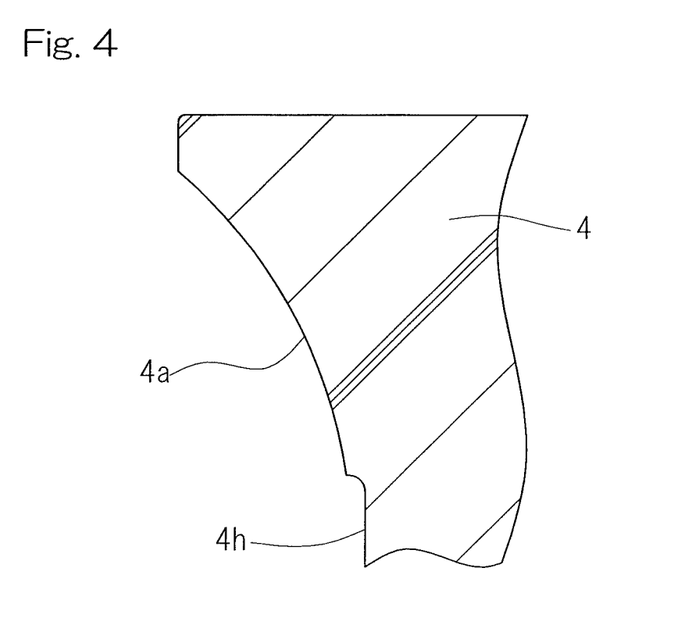
FIG. 4 is an enlarged sectional view showing a ball contact surface of the spacer.

As best shown in FIGS. 3 and 4, each of the ball contact surfaces 4a on the respective opposite sides of the spacer 4 represents a single spherical shape of a diameter somewhat greater than the radius of curvature R of any one of the balls 3 as shown by the dotted lines. As shown in FIG. 3, the spherical shape containing the ball contact surfaces 4a on each side of the spacer 4 is shown by the solid line R1. It is to be noted that as will become clear from the subsequent description, the ball contact surface 4a on each side of the spacer 4 is not necessarily limited to the spherical shape.

As shown best in FIG. 5, the mold assembly 12 is made up of an upper mold 13 and a lower mold 14. The upper and lower molds 13 and 14, when mated together, define a molding cavity 15 of a shape complemental to the shape of the spacer 4. The upper mold 13 has that gate G defined therein, and a position of the opening of the gate G that opens into the cavity 15 is the gate position P1 referred to previously. The resinous material in a state heated to melt is filled from an injection molding machine (not shown) within the cavity 15, controlled under a predetermined pressure and finally cooled. After the cooling, the mold assembly 12 is opened with the upper and lower molds 13 and 14 separated from each other, a molded product, that is, the spacer 4 is knocked out from the mold assembly 12. It is, however, to be noted that the mold assembly 12 may have a plurality of cavities 15 defined therein so that a plurality of spacers 4 of the identical shape can be molded simultaneously.

Figure 6:
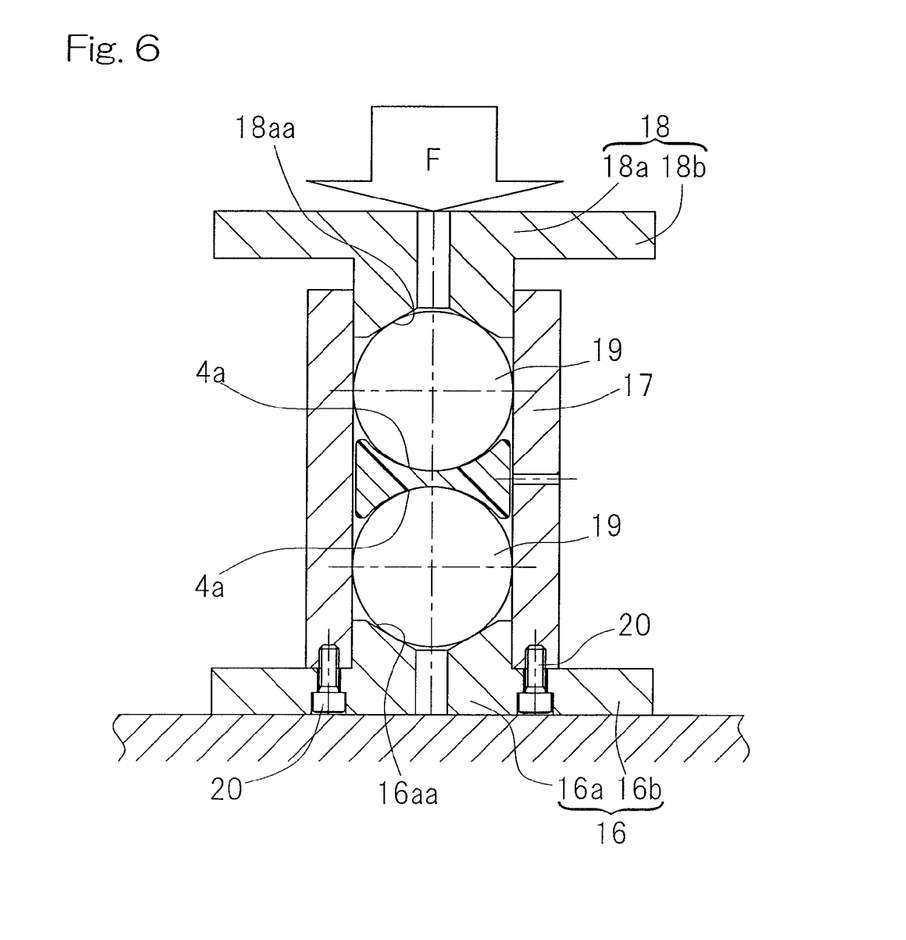
FIG. 6 is a sectional view used to explain a crush test method used to examine the spacer.
Figure 7:
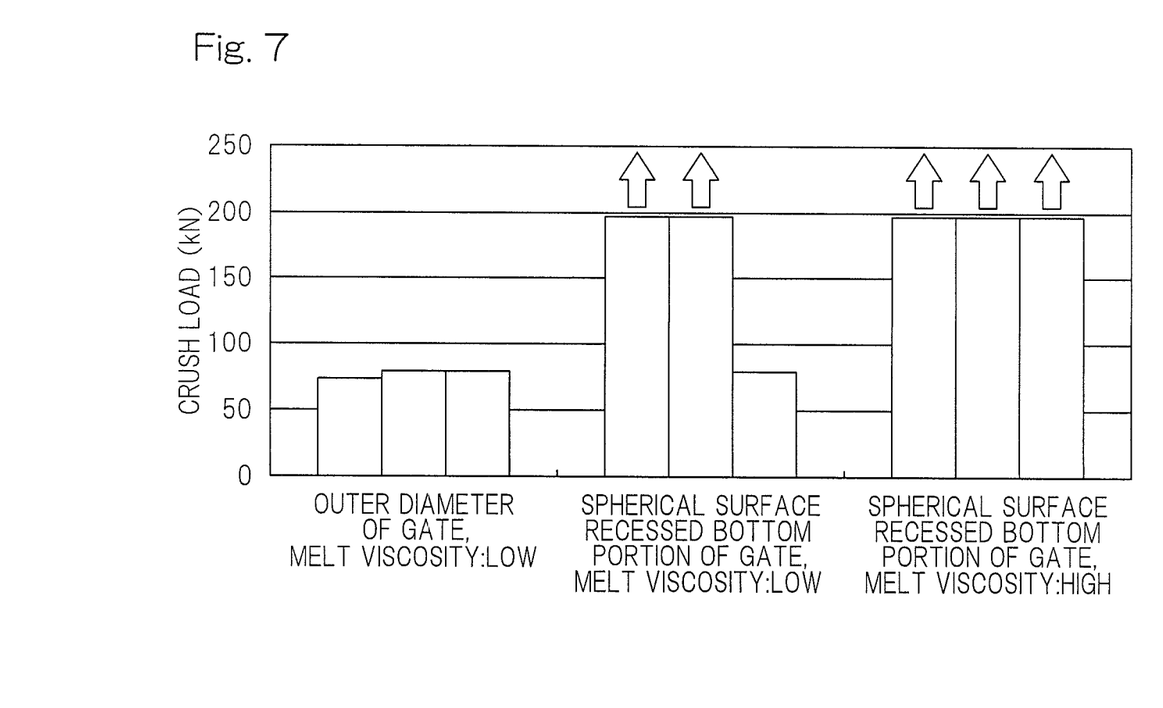
FIG. 7 is a diagram showing the relationship between both of a gate position and the melt viscosity and the crushing load.

(1) Regarding Strength Comparison of the Spacer:

In order to ascertain the difference in strength in dependence on the gate position and the difference in strength in dependence on the melt viscosity, a series of crush tests were conducted on the spacers. FIG. 6 illustrates a sectional view used to explain the crush test method for testing the spacers and FIG. 7 illustrates the relationship between both of the gate position and the melt viscosity and a crush load applied.

The spacers tested include:

The spacer according to this embodiment, which was made of a material having a high melt viscosity (for example, the melt viscosity of 1110 Pa·s at the temperature of 270° C.) and in which the gate position had been disposed at the depression;

The spacer according to the comparison (1), which was made of a material having a low melt viscosity (for example, the melt viscosity of 490 Pa·s at the temperature of 270° C.) and in which the gate position had been disposed at the depression.

The spacer according to the comparison (2), which was made of a material having a low melt viscosity (for example, the melt viscosity of 490 Pa·s at the temperature of 270° C.) and in which the gate position had been disposed in an outer diametric portion of the spacer.

As shown in FIG. 6, the testing machine used includes a seat member 16, a tubular member 17 and a presser member 18. The seat member 16 is made up of a cylindrical seat member body 16a having an inwardly concaved seat 16aa on which a steel ball 19 is supported. A flange 16b is added to an outer periphery of the seat member body 16a so as to extend radially outwardly therefrom and the flange 16b and the seat member body 16a are placed and supported. The tubular member 17 is mounted on the outer periphery of the seat member body 16a and connected with the flange 16b by means of a plurality of set bolts 20. This tubular member 17 has an inner diameter formed to a predetermined diameter greater than those of the spacer to be tested and the steel ball 19. Accordingly, the spacer and the steel ball 19 can be inserted into the interior of the tubular member 17.

The presser member 18 is made up of a presser member body 18a of a cylindrical configuration having an inwardly concaved press surface 18aa for pressing the steel balls 19 and a flanged portion 18b. Through the steel ball 19 supported on the seat 16aa within the interior of the tubular member 17, the spacer to be tested and the additional steel ball 19 are successively inserted. At this time, the ball contact surfaces 4a and 4b on the respective sides of the spacer to be tested are held in contact with the upper and lower steel balls 19 and 19, respectively. The presser member body 18a is slidably inserted into a portion of the interior of the tubular member 17 adjacent an upper end thereof and the upper steel ball 19 is then pressed through the presser surface 18aa. Accordingly, with the spacer being loaded with a predetermined load at a predetermined velocity, the crush load can be measured. According to the crush test method employed in the practice of this embodiment, each of the spacers tested was loaded with the load at the rate of 1.6 kN/sec. to determine the crush load. It is, however, to be noted that the maximum load applied was set to 196 kN.

According to the above described crush test, it has been found all of the spacers according to the Comparison (2) were crushed at a low applied load of about 70 to 80 kN and a spacer according to the Comparison (1) was crushed at a low load. In contrast thereto, the spacers 4 according to the present invention was all found not crushed even at the maximum applied load of 196 kN.

(2) Regarding the Rate of Occurrence of Voids in the Spacer:

The rates of generation of voids in the spacers, made of two materials having different melt viscosities, respectively, were compared. Other molding conditions were all unified.

In the case of the use of the material having a low melt viscosity (for example, the melt viscosity of 490 Pa·s at the temperature of 270° C.), 13 spacers out of the 400 spacers were found having voids occurred therein.

In the case of the use of the material having a high melt viscosity (for example, the melt viscosity of 1110 Pa·s at the temperature of 270° C.), all of the 400 spacers were found having no void occurred therein.

According to the slewing bearing assembly of the kind hereinabove described, because the resinous material having the melt viscosity equal to or higher than 1000 Pa·s (at the temperature of 270° C.) is employed for each of the spacers 4, occurrence of the voids in the spacer can be suppressed. Accordingly, it is possible to prevent an insufficient strength from occurring in the spacers 4. Since each of the spacers 4 has its dimensions determined in dependence of the size of the ball with which it operatively cooperates in the slewing bearing assembly, it can be concurrently used in various bearing sizes regardless of the ball PCD, that is, the ball pitch circle diameter. For this reason, additional expenses such as, for example, cost of the mold assembly or the like can be suppressed. Thus, the cost of manufacture of the slewing bearing assembly can be reduced advantageously.

Since the gate position P1 of the mold assembly 12 is disposed in the depression 4h, the rate of occurrence of voids in a surface and/or inside of the spacer 4 can be reduced and any bias in circumferential strength of the spacer 4 cal also be avoided. In this slewing bearing assembly, each of the balls 3 has a diameter greater than 40 mm. In the case of the spacer 4 used with the balls 3 of such diametric dimension, it will become a thick walled product having a wall thickness greater than that used in the ball of not greater than 40 mm. Even with the spacer 4 that will become such a thick walled product, an undesirable occurrence of voids in the surface and/or inside of the spacer 4 is suppressed since the resinous material of the spacer is chosen to be of a kind having the melt viscosity of 1000 Pa·s (270° C. in temperature), and, therefore, the lack of a sufficient strength of the spacer 4 can be avoided.

The inner ring 1 of the slewing bearing assembly is of a type including the raceway ring body 7 with the insertion holes 9 and 9 for receiving therein the balls 3 and the spacers 4 defined in such raceway ring body 7 at respective locations between the raceway grooves 1a and 1b and between the raceway grooves 2a and 2b so as to extend completely therethrough in a direction radially of the bearing assembly. Also, the plugs 8 and 8 accommodated within the respective insertion holes 9 and 9 are fixed by the connecting member 10 to thereby form respective parts of the raceway grooves 1a and 1b. According to this construction, prior to assemblage of the bearing assembly, in a condition in which the plug 8 is temporarily fixed within the respective insertion hole 9 in the raceway ring body 7, the raceway grooves 1a and 1b are formed. Subsequently, the plug 8 is removed from the insertion hole 9. At the time of assemblage of the bearing assembly, after a required number of the balls 3 and the spacers 4 have been inserted through the insertion hole 9 in the raceway ring body 7, the insertion hole 9 is embedded with and fixed by the plug 8. In this way, the assemblage of the bearing assembly can be simply accomplished. It is to be noted that since a portion of each of the plugs 8, which eventually forms a part of the raceway groove, is not heat treated and is therefore, not hardened, it is preferred that circumferential positions in the raceway ring body 7, where at least the insertion holes 9 and 9 are formed, be held in a setting condition in which little load will be imposed. However, since in the instance now under discussion, the insertion holes 9 and 9 are arranged at respective positions adjacent to each other in the circumferential direction, the raceway ring body 7 can be set in the desirable setting condition. Therefore, the bearing lifetime can be prolonged.

Figure 8:
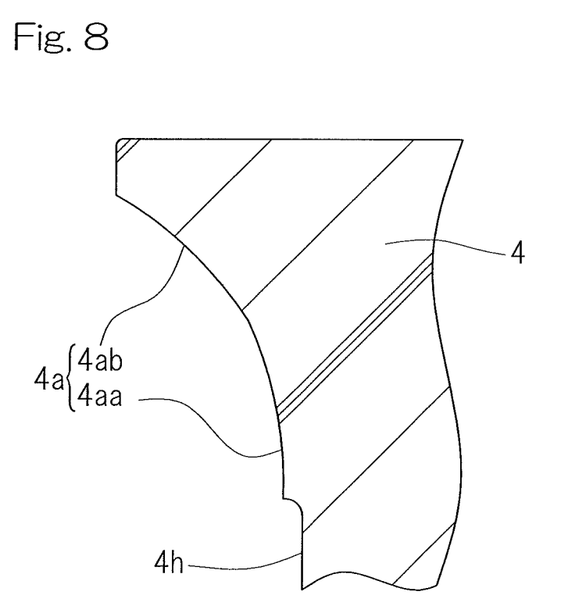
FIG. 8 is an enlarged sectional view showing the ball contact surface of the spacer employed in the slewing bearing assembly designed in accordance with a second embodiment of the present invention.

Now with particular reference to FIG. 8, the spacer for the slewing bearing assembly according to a second embodiment will be described in detail. As shown therein, each of the ball contact surfaces 4a and 4a on the respective sides of the spacer 4 may be of a composite curved shape comprised of a contact surface radially inner portion 4aa and a contact surface radially outer portion 4ab, which are in the form of a curved surface of a rotated body depicted when two arches having a center curvature and a curvature center different from each other are rotated 360°.

More specifically, the contact surface radially inner portion 4aa is of a shape having a spherical portion of a diameter substantially equal to the radius R of each of the balls (See FIG. 3) as a ball contact portion. Instead of the ball contact surfaces 4a and 4a of the composite curved shape as described above, the spacer 4 may be so shaped that the ball contact surfaces 4a and 4a on the respective sides thereof are of a single conical surface shape or a composite conical surface shape comprised of a contact surface radially inner portion and a contact surface radially outer portion of respective conical surfaces having different center angles. Alternatively, the ball contact surfaces 4a and 4a on the respective sides of the spacer 4 may have a sectional shape similar to the Gothic arch comprised of two arches having different centers of curvature.

A rotating section support device for the wind powered turbine will now be described.

Figure 9:
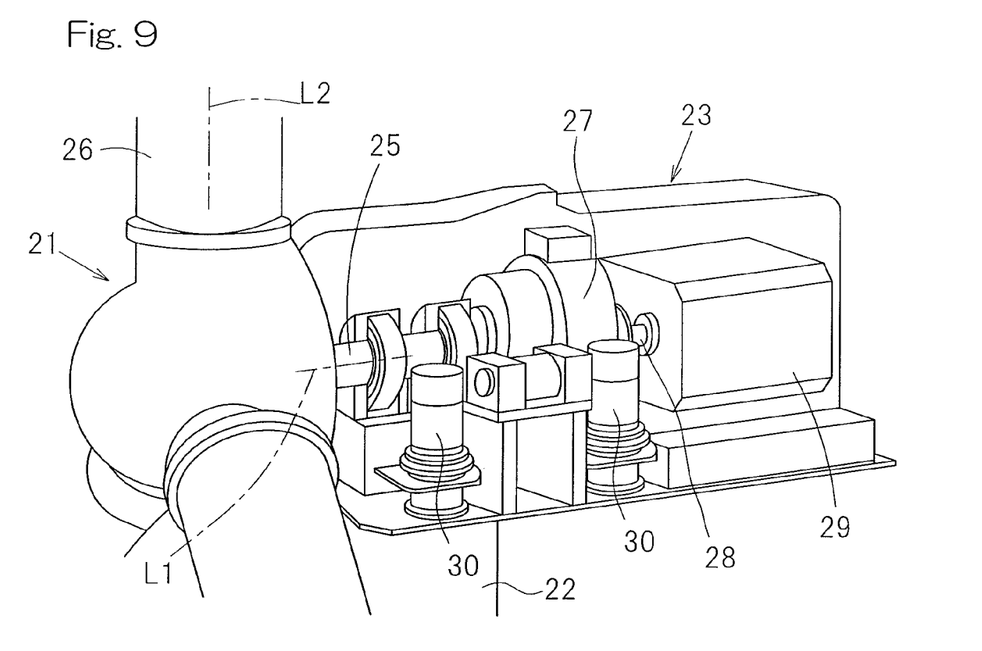
FIG. 9 is a perspective view showing an example of a wind powered turbine with a portion thereof cut out.
Figure 10:
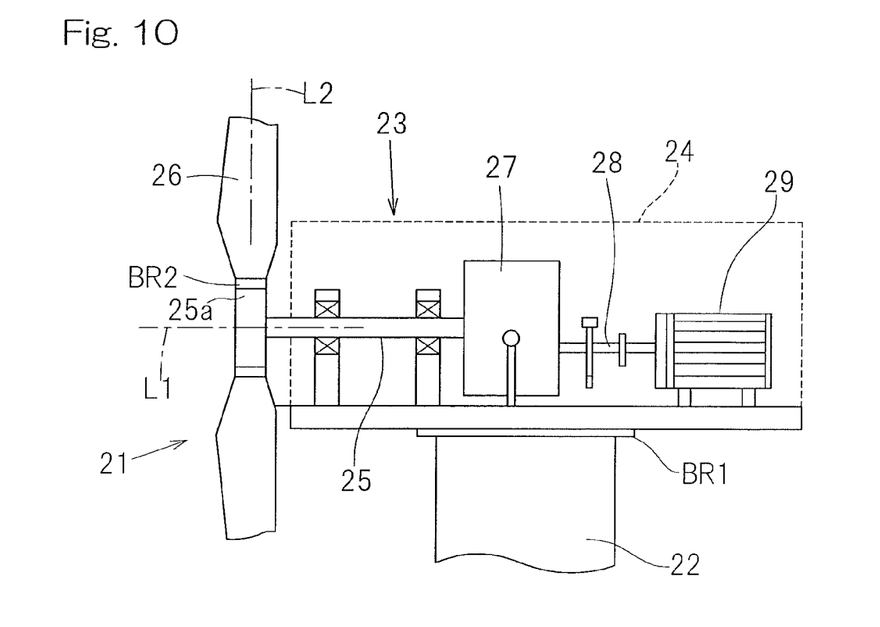
FIG. 10 is a schematic side view of the wind powered turbine with a nacelle shown by the phantom line.

FIGS. 9 and 10 illustrate one example of a wind mill of the wind powered turbine. The wind mill, identified by 21, is so constructed that a nacelle 23 is mounted on a support post 22 for angular movement in a horizontal plane about the longitudinal axis of the support post 22, a main shaft 25 is rotatably supported within a casing 24 of the nacelle 23, and a wind powered turbine 26, which is a swirl vane, is mounted on one end portion of the main shaft 25 protruding outwardly from the casing 24. The other end of the main shaft 25 is connected with a speed increasing unit 27 having its output shaft 28 connected in turn with a rotor shaft of a power generator 29.

The nacelle 23 is supported by a slewing bearing assembly BR1 for swinging motion, and the slewing bearing assembly designed in accordance with the first embodiment shown in and described with particular reference to FIGS. 1 to 4 is employed for the slewing bearing assembly BR1. As best shown in FIG. 9, a plurality of drive sources 30 are installed within the casing 24, each of those drive sources 30 having a respective pinion gear mounted thereon through a corresponding speed reducer not shown. The gear 6 of the outer ring 2 of the slewing bearing assembly as best shown in FIG. 1 are meshed with the pinion gear on the associated drive source 30. For example, the outer ring 2 is connected with and fixed to the support post 22 by means of the plurality of the internally threaded bolt holes 5 and the inner ring 1 is fixed to the casing 24. With the plural drive sources 30 driven in unison with each other, a slewing drive force thereof is transmitted to the outer ring 2. Accordingly, the nacelle 23 can swing relative to the support post 22.

Each of blades 26 is slewingly supported by a slewing bearing assembly BR2. This slewing bearing assembly BR2 is of a type, in which in place of the inner ring 1 of a split type shown in FIG. 1, an inner ring of one piece structure is applied and, in place of the gear 6 provided in the outer ring 2, what is provided with a gear on an inner peripheral surface of the inner ring of one piece structure is applied. A drive source for rotating the wind powered turbine 26 about the longitudinal axis of the support post 22 is provided on a protruding end portion 25a of the main shaft 25. The outer ring of this slewing bearing assembly is connected with and fixed to the end portion 25a and the gear affixed to the inner peripheral surface of the inner ring is meshed with a pinion gear of the previously described drive source. When this drive source is driven to transmit a slewing drive force to the inner ring, each blade of the wind powered turbine 26 can be revolved. Accordingly, the slewing bearing assembly BR2 can support each blade of the wind powered turbine 26 of the wind mill so that the respective blade of the wind powered turbine 26 can be revolved about a longitudinal axis L2 substantially perpendicular to the main shaft longitudinal axis L1 relative to the main shaft 25. In this way, the angle of each blade of the wind powered turbine 26 and the orientation of the nacelle 23 can be changed as needed in dependence on the condition of the wind.

The slewing bearing assembly of the structure hereinbefore fully described in connection with the embodiments of the present invention can be equally applied to, other than the wind powered turbine referred to hereinbefore, a construction machinery such as, for example, a hydraulically operated shovel and crane, a rotary table of a machine tool, a gun mount or barbette and a parabolic antenna.

Although the present invention has been fully described in connection with the embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . Inner ring
2 . . . Outer ring
1a, 1b, 2a, 2b . . . Raceway groove
3 . . . Ball
4 . . . Spacer
4h . . . Depression
7 . . . Raceway ring body
8 . . . Plug
12 . . . Mold assembly
21 . . . Wind mill
23 . . . Nacelle
25 . . . Main shaft
26 . . . Blade
P1 . . . Gate position

What is claimed is:

1. A slewing bearing assembly comprising:
an inner ring formed with a raceway groove;
an outer ring formed with a raceway groove;
a plurality of balls interposed between the raceway groove of the inner ring and the raceway groove of the outer ring, each of the balls having a diameter of 30 mm or larger; and
a plurality of spacers, each separately interposed between the neighboring balls and having a ball contact surface that represents a single spherical shape of a diameter greater than a radius curvature of each ball;
wherein the slewing bearing assembly is used to rotatably support a blade or a nacelle of a wind mill of a wind powered turbine and in the form of a four point contact ball bearing having respective sectional shapes of the raceway grooves formed to represent shapes effective to allow each ball to achieve a four point contact with an inner surface of the raceway groove of the inner ring and an inner surface of the raceway groove of the outer ring;
each of the spacers is made of a resinous material, the resinous material having a melt viscosity within the range of 1000 to 2000 Pa·s at a temperature of 270° C.,
the inner ring includes a raceway ring body formed with an insertion hole defined so as to extend completely through the raceway ring body in a radial direction of the bearing assembly, and a plug inserted into the insertion hole and having an outer diametric surface that forms a circumferential part of the raceway groove of the inner ring,
a portion of an outer peripheral surface of the plug positioned radially inwardly of the connecting hole is formed with an annular groove and an annular sealing member is fitted into the annular groove, and
the raceway ring body and the plug are formed with respective connecting holes into which a tapered pin is inserted to fix the plug to the raceway ring body.

2. The slewing bearing assembly as claimed in claim 1, wherein each of the spacers has opposite sides formed with the ball contact surface each representing an inwardly recessed spherical surface of a recessed shape and a gate position of a mold assembly for injection molding the spacer is arranged at a bottom portion of the recessed shape.

3. The slewing bearing assembly as claimed in claim 1, wherein the resinous material of each spacer is PA6.

4. The slewing bearing assembly as claimed in claim 1, wherein the diameter of each of the balls is within the range of 30 to 80 mm.

5. The slewing bearing assembly as claimed in claim 1, which is used to rotatably support the nacelle of the wind mill relative to a support post.

6. A rotation section support apparatus for a wind mill having a blade supported by the slewing bearing assembly, as defined in claim 1, relative to a main shaft, for rotation about an axis substantially perpendicular to an axis of the main shaft.

7. A rotation section support apparatus for a wind mill having a nacelle supported by the slewing bearing assembly, as defined in claim 1, for rotation about a support post.

8. A slewing bearing assembly comprising:
an inner ring formed with a raceway groove;
an outer ring formed with a raceway groove;
a plurality of balls interposed between the raceway groove of the inner ring and the raceway groove of the outer ring, each of the balls having a diameter of 30 mm or larger; and
a plurality of spacers, each separately interposed between the neighboring balls and having a ball contact surface that represents a single spherical shape of a diameter greater than a radius curvature of each ball;
wherein the slewing bearing assembly is used to rotatably support a blade or a nacelle of a wind mill of a wind powered turbine and in the form of a four point contact ball bearing having respective sectional shapes of the raceway grooves formed to represent shapes effective to allow each ball to achieve a four point contact with an inner surface of the raceway groove of the inner ring and an inner surface of the raceway groove of the outer ring;
each of the spacers is made of a resinous material, the resinous material having a melt viscosity within the range of 1000 to 2000 Pa·s at a temperature of 270° C.,
the inner ring includes a raceway ring body formed with a pair of insertion holes defined so as to extend completely through the raceway ring body in a radial direction of the bearing assembly, the pair of insertion holes being disposed at positions adjacent to each other in a circumferential direction and separated from each other in the circumferential direction at positions so as to define a phase angle of 4 to 5°, and a pair of plugs inserted into the pair of insertion holes, respectively, each plug having an outer diametric surface that forms a circumferential part of the raceway groove of the inner ring, and
the raceway ring body and the plugs are formed with respective connecting holes into which a tapered pin is inserted to fix the plugs to the raceway ring body.

* * * * *